United States Patent Office 2,794,810
Patented June 4, 1957

2,794,810

AMINOALKYL CYCLOALKYLCARBAMATES

John W. Cusic, Skokie, Ill., assignor, by mesne assignments, to G. D. Searle & Co., Skokie, Ill., a corporation of Delaware No Drawing. Application March 8, 1952, Serial No. 275,661

13 Claims. (Cl. 260—326.3)

This invention relates to basic esters of disubstituted carbamic acids wherein one of the substituents on the nitrogen atom of the carbamic acid is a cyclic radical linked through a carbon atom thereof which is aliphatic in character, to salts of such esters, and to methods of manufacturing such esters and salts. More particularly this invention relates to basic esters of the following general formula

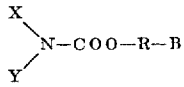

wherein X and Y are non-aromatic radicals, R is a hydrocarbon radical and B is a non-aromatic amino radical.

This application is a continuation-in-part of my copending application Serial No. 140,969, filed January 27, 1950, now abandoned.

The compounds of this invention are useful as medicinal agents. They are of value as antispasmodic, coronary dilator, adrenolytic and anticholinergic agents. They may be used in the form of the free bases, but preferably are used as acid addition or quaternary ammonium salts thereof. The salts are generally crystalline solids which are readily soluble in water and therefore constitute a preferred embodiment of this invention. It is an object of this invention to provide new substances useful for the foregoing purposes. It is a further object to provide methods for producing said new substances.

In the foregoing formula X and Y may represent the same or different non-aromatic carbocyclic radical and include radicals such as cyclopentyl, cyclohexyl, methylcyclohexyl, methoxycyclohexyl, ethoxycyclohexyl, ethylcyclohexyl, cycloheptyl, α-indanyl, β-indanyl, and related radicals wherein the carbon atom of the carbocyclic radical which is attached to the nitrogen atom is non-aromatic in character, that is, the carbon atom of the carbocyclic radical attached to nitrogen is linked to three other atoms or substituents by three single bonds. One of the radicals X and Y can be an alkyl radical of one to eight carbon atoms. The hydrocarbon radical, R, includes lower alkylene radicals containing one to five carbon atoms such as methylene, ethylene, propylene, butylene, trimethylene, pentamethylene, and the like. The hydrocarbon radical R may also be a part of a heterocyclic ring which includes the amino substituent represented by B. The amino group B represents secondary and tertiary amino radicals which are non-aromatic in character. It includes monoalkylamino radicals such as methylamino, ethylamino, propylamino, isopropylamino, butylamino isobutylamino, secondary-butylamino, isoamylamino, hexylamino, isohexylamino, and related radicals. It also includes dialkylamino radicals such as diethylamino, diamylamino, dihexylamino, diisohexylamino, methylpropylamino, methylbutylamino, ethylpropylamino, and similar radicals. The amino group, B, may contain substituted alkyl radicals such as β-hydroxyethyl, β-chloroethyl, γ-hydroxypropyl, β,γ-dihydroxypropyl, β-acetoxyethyl, carboethoxymethyl, β-carbo-ethoxyethyl, β - carbomethoxypropyl, β - bromoethyl, γ-bromopropyl and the like. The amino radical, B, also includes non-aromatic heterocyclic amino radicals such as pyrrolidino, piperidino, morpholino, 4-methylpiperazino, 4-ethylpiperazino, lupetidino, pipecolino, methylpyrrolidino, dimethylpyrrolidino, and related saturated heterocyclic amino radicals. The amino group, B, therefore represents non-aromatic amino radicals derived from amines having dissociation constants in the range of about $10^{-3}$ to $10^{-5}$.

The organic bases of the foregoing type form salts with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, oxalic, and related acids. They also form crystalline salts with 8-haloxanthines which have a hydrogen atom in position 7, such as 8-chlorotheophylline, 8-bromotheophylline, 8-iodotheophylline, 8-chloro-1,3-diethylxanthine, 8-bromo-1,3-diethylxanthine, 8-chloroxanthine, 8-bromoxanthine, 8-chloro-3-methylxanthine and 8-bromo-3-methylxanthine. They also form quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromo-ethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, propylene chlorohydrin, γ-hydroxypropyl bromide, allyl chloride, methallyl chloride, crotyl bromide, and the like.

The compounds of this invention can be prepared by reacting two or more equivalents of an amine of the formula

with one equivalent of a haloalkyl halocarbonate (also known as haloformate) of the formula

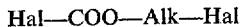

Hal—COO—Alk—Hal wherein Hal is a halogen atom of atomic number greater than 9 and includes chlorine, bromine, and iodine, and wherein Alk is a lower alkylene radical. This reaction is preferably carried out at low temperature (0–25° centigrade) in an inert solvent, with or without an acid-binding agent. The reaction can also be conducted in aqueous medium in the presence of caustic alkali, avoiding an excess of the amine. The resulting haloalkyl disubstituted carbamate has the formula

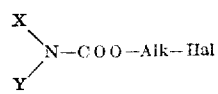

This halogenated ester is then reacted with two or more equivalents of a monoalkyl, dialkyl or saturated heterocyclic amine, generally at temperatures in the range of 50–150° C. The basic ester so formed is removed by conventional procedures and may be purified by distillation or by conversion to a crystalline salt.

The compounds of this invention may also be prepared by reacting a secondary amine of the formula

with phosgene in an inert solvent to form a disubstituted carbamyl chloride of the formula

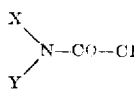

The latter is reacted with an amino alcohol of the formula

HO—R—B generally in an inert solvent at temperatures in the range of 25–150° C.

The following examples illustrate in more detail the present invention without, however, limiting it thereto. The relative quantities of materials are given in parts by weight, temperatures are given in degrees centigrade (°C.) and pressures in millimeters (mm.) of mercury.

*Example 1*

To 181 parts of dicyclohexylamine cooled with ice is added with agitation a solution of 71.5 parts of β-chloroethyl chlorocarbonate in 2120 parts of dry ether. After addition benzene is added and the mixture filtered. The filtrate is evaporated under vacuum and the residue of β-chloroethyl dicyclohexylcarbamate is used in the next step.

A solution of 77 parts of β-chloroethyl dicyclohexylcarbamate and 35 parts of dimethylamine in 80 parts of methyl ethyl ketone containing 1 part of potassium iodide is heated in a closed vessel at about 65° C. for 4 days. The reaction mixture is cooled, agitated with benzene and dilute muriatic aicd, and then filtered. The aqueous layer is separated, made alkaline and extracted with ether. The ether extract is dried, filtered and treated with an equivalent of absolute alcoholic hydrogen chloride. The crystalline precipitate of the hydrochloride of β-dimethylaminoethyl dicyclohexylcarbamate is removed, washed and dried. It melts at 183–184° C. The basic ester has the formula

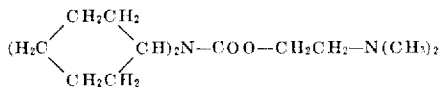

*Example 2*

20 parts of β-dimethylaminoethyl dicyclohexylcarbamate and 10 parts of methyl chloride in 80 parts of methyl ethyl ketone are kept at room temperature for about 15 hours. The precipitate of β-dimethylaminoethyl dicyclohexylcarbamate methochloride is broken up, collected on a filter, washed and dried. It melts at 205–206° C.

*Example 3*

57 parts of β-chloroethyl dicyclohexylcarbamate and 40 parts of diethylamine in 80 parts of methyl ethyl ketone containing 1 part of potassium iodide are heated in a closed vessel at 65–70° C. for six days. The reaction mixture is cooled and agitated with dilute hydrochloric acid and ether. The resulting mixture is filtered and the acid layer is separated, made alkaline, and extracted with ether. The ether extract is dried and evaporated and the residue of β-diethylaminoethyl dicyclohexylcarbamate is distilled at 180–182° C. at 2 mm. pressure. It forms a crystalline hydrochloride when treated in absolute ether with hydrogen chloride. This salt melts at 194–196° C.

β-Di-n-butylaminoethyl dicyclohexylcarbamate is produced in the same way from 95 parts of β-chloroethyl dicyclohexylcarbamate and 118 parts of di-n-butylamine. It distills at 202–206° C. at 2 mm. pressure.

*Example 4*

β-Piperidinoethyl dicyclohexylcarbamate is produced by the method of Example 3 from 57 parts of β-chloroethyl dicyclohexylcarbamate and 42.5 parts of piperidine. It distills at 197–200° C. at 2 mm. pressure and forms a crystalline hydrochloride melting at 186–188° C.

*Example 5*

β-Chloroethyl n-hexylcyclohexylcarbamate is prepared by the method of Example 1 from 732 parts of n-hexylcyclohexylamine and 286 parts of β-chloroethyl chlorocarbonate. 77 parts of this ester is heated at 65–70° C. for four days in a closed vessel with 50 parts of diethylamine and 1 part of potassium iodide in 80 parts of methyl ethyl ketone. The basic ester is isolated by the method of Example 3. The β-Diethylaminoethyl n-hexylcyclohexylcarbamate distills at 178–182° C. at 22 mm. pressure. It forms a crystalline hydrochloride melting at 121–122° C.

β-Diethylaminoethyl n-heptylcyclohexylcarbamate is made by the above procedure by the use of an equivalent quantity of n-heptylcyclohexylamine in lieu of n-hexylcyclohexylamine. This ester distills at 186–188° C. at 2 mm. pressure. It forms a crystalline hydrochloride melting at 88–90° C.

*Example 6*

50 parts of cyclopentylcyclohexylamine and 33 parts of β-chloroethyl chlorocarbonate are reacted as in Example 1. The β-chloroethyl cyclopentylcyclohexylcarbamate so obtained is mixed with 40 parts of dimethylamine in 80 parts of methyl ethyl ketone containing 1 part of potassium iodide and the resulting solution is heated at 75° C. for three days in a closed vessel. The basic ester is isolated as in Example 3. β-Dimethylaminoethyl cyclopentylcyclohexylcarbamate distills at 149–152° C. at 2 mm. pressure and forms a crystalline hydrochloride melting at 162—164° C.

*Example 7*

29.8 parts of β-dimethylaminoethyl dicyclohexylcarbamate and 39.56 parts of ethylene bromide in 80 parts of methyl ethyl ketone are refluxed for two hours. The white crystalline precipitate of the quaternary ammonium salt is collected on a filter, washed with ether and dried. This salt, which may be named β-(β-bromoethyldimethylamino)ethyl dicyclohexylcarbamate bromide, melts at 195–196° C.

15 parts of β-dimethylaminoethyl dicyclohexylcarbamate and 15 parts of ethylene bromohydrin in 40 parts of methyl ethyl ketone are refluxed for 15 hours, then cooled. The solution is diluted with ether and the crystalline precipitate of the quaternary salt, which can be named β-(β-hydroxyethyldimethylamino)ethyl dicyclohexylcarbamate bromide, is collected on a filter, washed and dried. It melts at 127–128° C.

*Example 8*

70 parts of β-chloroethyl dicyclohexylcarbamate and 75 parts of β-methylaminoethanol are dissolved in 80 parts of methyl ethyl ketone containing 1 part of potassium iodide. The solution is refluxed for three days, then chilled and agitated with dilute mineral acid and ether. The aqueous layer is separated, made alkaline and extracted with ether. The ether extract is dried and evaporated. The residue of β-(β-hydroxyethylmethylamino)-ethyl dicyclohexylcarbamate distills at 208–210° C. at 2 mm. pressure. It forms a crystalline hydrochloride which after recrystallization from a mixture of ethyl acetate and methyl ethyl ketone melts at 132–133° C.

*Example 9*

400 parts of dicyclohexylamine in 100 parts of anhydrous ether are added with good agitation to a solution of 120 parts of phosgene in 500 parts of dry toluene at 0° C. After the addition, the mixture is agitated at room temperature for 15 hours. It is then filtered and the filtrate is evaporated under vacuum. The residue of crystalline dicyclohexylcarbamyl chloride is dissolved in 170 parts of anhydrous toluene containing 52 parts of β-diethylaminopropanol. The resulting solution is refluxed for 15 hours during which time a heavy precipitate forms.

The reaction mixture is diluted with dilute hydrochloric acid and heated and agitated until no solid phase remains. The aqueous layer is separated, filtered, chilled, made alkaline and extracted with ether. The ether extract is dried and distilled. β-Diethylaminopropyl dicyclohexylcarbamate distills at 170–180° C. at 3 mm. pressure. An ether solution of this basic ester on treatment with absolute alcoholic hydrogen chloride and chilling results in a white precipitate of the hydrochloride. The precipitate of the crystalline hydrochloride is collected on a filter, washed and dried. It melts at 140–141° C.

β-Dimethylaminopropyl dicyclohexylcarbamate is made as above from 40 parts of dicyclohexylcarbamyl chloride and 30 parts of β-dimethylaminopropanol. It distills at 175–180° C. at 1.5 mm. pressure and forms a crystalline hydrochloride of M. P. 172–173° C.

δ-Dimethylaminobutyl dicyclohexylcarbaamte is produced in a similar way from 16 parts of dicyclohexylcarbamyl chloride and 13 parts of δ-dimethylaminobutanol. It distills at 182–186° C. at 1.5 mm. pressure.

β-Diisopropylaminoethyl dicyclohexylcarbamate is made in the same way from 75 parts of dicyclohexylcarbamyl chloride and 87 parts of β-diisopropylaminoethanol. It distills at 174–178° C. at 1.5 mm. pressure and forms a non-crystalline hydrochloride which is readily soluble in water. It also forms a crystalline methiodide of M. P. 203–204° C. (with decomposition).

Example 10

70 parts of β-chloroethyl dicyclohexylcarbamate, 100 parts of cyclohexylamine, 1 part of potassium iodide and 40 parts of methyl ethyl ketone are thoroughly mixed and refluxed for three days. The reaction mixture is chilled, diluted with dry toluene until a precipitate forms, then warmed until the precipitate dissolves and chilled to precipitate the hydrochloride of β-cyclohexylaminoethyl dicyclohexylcarbamate. The precipitated salt is taken up in about 800 parts of warm water, made alkaline and extracted with a mixture of benzene and ether. The extract is dried and evaporated. The residue of β-cyclohexylaminoethyl dicyclohexylcarbamate distills at 204–207° C. at 2 mm. pressure. It forms a crystalline hydrochloride melting at 189–191° C.

β-Isopropylaminoethyl dicyclohexylcarbaamte is made in the same way from 578 parts of β-chloroethyl dicyclohexylcarbamate and 354 parts of isopropylamine. It distills at 202–204° C. at 10 mm. pressure and forms a crystalline hydrochloride melting at 158–159° C.

N-propylaminoethyl dicyclohexylcarbamate is produced similarly in a closed vessel from 578 parts of β-chloroethyl dicyclohexylcarbamate and 354 parts of n-propylamine. The basic ester distills at 202–205° C. at 10 mm. pressure. It forms a crystalline hydrochloride melting at 121–122° C.

Example 11

72.4 parts of dicyclohexylamine in 710 parts of dry ether are cooled to about 0° C. and then 31.4 parts of γ-chloropropyl chlorocarbonate in 300 parts of dry ether are added dropwise with good agitation. The reaction mixture is stirred for three hours after the addition, then filtered and the filtrate evaporated. The residue of γ-chloropropyl dicyclohexylcarbamate is thoroughly mixed with 30 parts of dimethylamine, 1 part of potassium iodide, and 40 parts of methyl ethyl ketone. This mixture is heated at 60–70° C. for three days in a closed vessel. The basic ester is isolated as in Example 1. γ-Diethylaminopropyl dicyclohexylcarbamate distills at 168–172° C. at 1.5 mm. pressure. It forms a crystalline hydrochloride melting at 144–146° C.

Example 12

50 parts of dicyclohexylcarbamyl chloride and 40 parts of 1-dimethylamino-2-propanol in 165 parts of methyl ethyl ketone are refluxed for about 15 hours. A heavy precipitate forms within a few minutes. The reaction mixture is cooled, broken up, diluted with additional methyl ethyl ketone and filtered. The filtrate is evaporated under vacuum and the residue of β-dimethylamino-isopropyl dicyclohexylcarbamate is distilled at 150–152° C. at 1.5 mm. pressure. It forms a crystalline hydrochloride after which recrystallization from isopropanol and ether melts at 198–199° C.

Example 13

243 parts of dicyclohexylcarbamyl chloride and 230 parts of 1-methyl-4-piperidinol in 1650 parts of methyl ethyl ketone are refluxed for 24 hours. The reaction mixture is chilled and filtered and the filtrate is evaporated under vacuum. The residue of 1-methyl-4-piperidinyl dicyclohexylcarbamate is taken up in dilute hydrochloric acid, washed with ether, made alkaline, extracted with ether, dried and evaporated. The residue of 1-methyl-4-piperidinyl dicyclohexylcarbamate distills at 181–183° C. at 1.5 mm. pressure. It forms a crystalline hydrochloride melting at 208–210° C.

Example 14

152.6 parts of α-chloroindane (α-chlorohydrindene) and 198 parts of cyclohexylamine in 1000 parts of benzene are refluxed for 15 hours. The reaction mixture is chilled and filtered. The filtrate is evaporated under vacuum and the residue is dissolved in ether and again filtered and evaporated. The final residue is distilled under vacuum. Cyclohexyl-α-indanylamine distills at about 113° C. at 0.3 mm. pressure.

887 parts of cyclohexyl-α-indanylamine and 36 parts of β-chloroethyl chlorocarbonate in 1000 parts of dry ether are reacted as in Example 1. The reaction mixture is diluted with benzene, allowed to stand for 15 hours, then filtered and the filtrate is evaporated, leaving a residue of β-chloroethyl cyclohexyl-α-indanylcarbamate. This is mixed with 1 part of potassium iodide and a solution of 30 parts of dimethylamine in 80 parts of methyl ethyl ketone and the resulting mixture heated for about 2½ days at 85° C. in a closed vessel. The basic ester is isolated as in Example 1. β-dimethylaminoethyl cyclohexyl-α-indanylcarbamate distills at 204–207° C. at 2 mm. pressure. It forms a crystalline hydrochloride which, after recrystallization from a mixture of isopropanol and ether, melts at 161–162° C.

10 parts of β-dimethylaminoethyl cyclohexyl-α-indanylcarbamate and 23 parts of methyl iodide are dissolved in 40 parts of methyl ethyl ketone. An exothermic reaction occurs upon mixing. The reaction mixture is chilled and the crystalline salt is collected on a filter, washed well with ether and dried. The crystalline methiodide thus formed melts at 208–210° C.

Example 15

A solution of 121 parts of dicyclohexylcarbamyl chloride and 145 parts of 1-(β-hydroxyethyl)-2,5-dimethylpyrrolidine in 550 parts of dry toluene is refluxed for 15 hours. The reaction mixture is poured into hot dilute muriatic acid with good agitation and benzene is added to the mixture. The organic layer is separated and the aqueous layer is filtered, chilled, made alkaline, and extracted with ether. The ether extract is dried and evaporated. The residue of β-(2,5-dimethylpyrrolidino)ethyl dicyclohexylcarbamate is distilled at 180–185° C. at 2 mm. pressure and is readily soluble in dilute hydrochloric acid.

Example 16

A solution of 198 parts of cyclohexylamine and 177 parts of 4-methylcyclohexyl bromide in 800 parts of benzene is refluxed for 20 hours, then cooled and filtered. The filtrate is diluted with ether, chilled and filtered. The final filtrate is evaporated under vacuum at steam temperature. The residue of 4-methylcyclohexylcyclohexylamine is distilled at 120–134° at 10 mm. pressure.

60 parts of 4-methylcyclohexylcyclohexylamine and 30 parts of β-chloroethyl chlorocarbonate are reacted as in Example 1. The β-chloroethyl 4-methylcyclohexylcyclohexylcarbamate so obtained is mixed with 40 parts of dimethylamine and 85 parts of methyl ethyl ketone containing 1 part of sodium iodide, and the resulting solution is heated in a closed vessel at 70–75° C. for three days. The basic ester is isolated as in Example 3. β-Dimethylaminoethyl 4-methylcyclohexylcyclohexylcarbamate distills at 155–150° C. at 1.5 mm. pressure. When treated in absolute ether with an equivalent of absolute alcoholic hydrogen chloride this ester forms a precipitate of a hydrochloride. The latter is readily soluble in water.

*Example 17*

A solution of 24 parts of dicyclohexylcarbamyl chloride and 21 parts of N-methylolpyrrolidine (pyrrolidinomethanol) in 90 parts of dry toluene is refluxed for 16 hours. It is then mixed with dilute hydrochloric acid and with benzene and agitated until all of the solid phase is dissolved in either the aqueous or organic layers. The aqueous layer is separated, filtered, chilled, made alkaline and extracted with ether. The ether extract is dried and evaporated. The residue of pyrrolidinomethyl dicyclohexylcarbamate is distilled under reduced pressure; B. P. 184–188° C. at 1.5 mm. pressure.

*Example 18*

β-Morpholinoethyl dicyclohexylcarbamate is produced as in Example 1 from 70 parts of β-chloroethyl dicyclohexylcarbamate and 87 parts of morpholine. It distills at 205–208° C. at 2 mm. pressure and forms a crystalline hydrochloride of M. P. 220–221° C.

β-Pyrolidinoethyl dicyclohexylcarbamate is made in the same way from 104 parts of β-chloroethyl dicyclohexylcarbamate and 70 parts of pyrrolidine. It distills at 188–192° C. at 3 mm. pressure and forms a crystalline hydrochloride which melts at 141–142° C. after recrystallization from a mixture of methyl ethyl ketone and ether. It also forms a crystalline methiodide which melts at 171–172° C.

*Example 19*

The following basic esters are produced by one or more of the methods illustrated in the foregoing examples:

A. β-2,6-lupetidinoethyl dicyclohexylcarbamate, B. P. 205–208° C./2 mm.

B. β-Diethylaminobutyl dicyclohexylcarbamate, B. P. 187–190° C./2 mm.

C. β - Thiamorpholinoethyl dicyclohexylcarbamate, B. P. 195–200° C./2 mm.

D. β-Diethylaminoethyl dicyclopentylcarbamate, B. P. 182–185° C./2 mm.

E. β-Diethylaminoethyl n-amylcyclopentylcarbamate, B. P. 173–176° C./2 mm.

F. β-Diethylaminoethyl n - butylcyclohexylcarbamate, B. P. 179–182° C./2.5 mm.

G. β-Di-(β-hydroxyethyl)ethyl dicyclohexylcarbamate, B. P. 217–222° C./0.9 mm.

*Example 20*

A solution of 24 parts of dicyclohexylcarbamyl chloride and 20.5 parts of 2-hydroxymethylimidazoline in 90 parts of dry methyl ethyl ketone is refluxed for 12 hours. It is then cooled, diluted with ether and filtered. The filtrate is evaporated under vacuum and the residue of 2-imidazolinylmethyl dicyclohexylcarbamate is distilled under high vacuum at 0.04 mm. pressure and a pot temperature of 110–115° C. It is a viscous light-colored oil which is soluble in dilute hydrochloric acid.

*Example 21*

A solution of 578 parts of β-chloroethyl dicyclohexylcarbamate and 354 parts of isopropylamine in 800 parts of methyl ethyl ketone containing 8 parts of potassium iodide is kept at about 80° C. for 6 days in a closed vessel.

The reaction mixture is cooled and treated with 1000 parts of ether and 1000 parts of dilute muriatic acid. The acid phase is separated, neutralized with caustic soda solution and extracted with ether. The ether extract is dried and evaporated. β-Isopropylaminoethyl dicyclohexylcarbamate is distilled at 202–204° C. at 10 mm. pressure. It forms a crystalline hydrochloride melting at 158–159° C.

I claim:

1. A member of the group consisting of a basic ester of a disubstituted carbamic acid and salts thereof, said basic ester having the formula

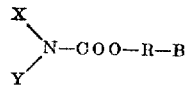

wherein X is a cycloalkyl radical, Y is a member of the group consisting of lower alkyl radicals and cycloalkyl radicals, R is a lower bivalent hydrocarbon radical and B is a member of the group consisting of mono(lower alkyl)amino, di(lower alkyl)amino, mono(lower hydroxyalkyl)amino, di(lower hydroxyalkyl)amino, loweralkyl-lower-hydroxyalkylamino, cycloalkylamino, and nonaromatic heterocyclic amino radicals of the type

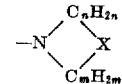

wherein $n$ and $m$ are integers greater than 1 and less than 4 and X is selected from the group of substituents consisting of —$CH_2$—, —S— and —O—, and the number of ring members in the heterocyclic amino radical is greater than 4 and less than 7.

2. An aminoalkyl disubstituted carbamate of the formula

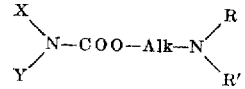

wherein X and Y are cycloalkyl radicals, Alk is a lower alkylene radical and R and R' are lower alkyl radicals.

3. An aminoalkyl disubstituted carbamate of the formula

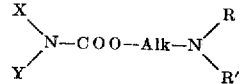

wherein X is a cycloalkyl radical, Y is an alkyl radical, Alk is a lower alkylene radical and R and R' are lower alkyl radicals.

4. An aminoalkyl disubstituted carbamate of the formula

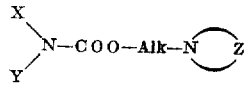

wherein X and Y are cycloalkyl radicals, Alk is a lower alkylene radical and Z is an alkylene radical containing at least 4 and not more than 7 carbon atoms and forming with the nitrogen atom a heterocyclic radical containing at least 5 and not more than 6 ring members.

5. An aminoalkyl disubstituted carbamate of the formula

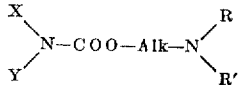

wherein X and Y are cyclohexyl radicals, Alk is a lower alkylene radical and R and R' are lower alkyl radicals.

6. An aminoalkyl disubstituted carbamate of the formula

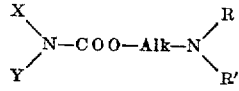

wherein X is a cyclohexyl radical, Y is an alkyl radical, Alk is a lower alkylene radical and R and R' are lower alkyl radicals.

7. An aminoalkyl disubstituted carbamate of the formula

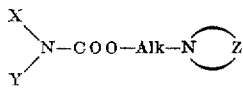

wherein X and Y are cyclohexyl radicals, Alk is a lower alkylene radical and Z is an alkylene radical containing at least 4 and not more than 7 carbon atoms and forming with the nitrogen atom a heterocyclic radical containing at least 5 and not more than 6 ring members.

8. An aminoalkyl disubstituted carbamate of the formula

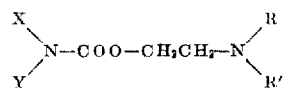

wherein X and Y are cyclohexyl radicals, and R and R' are lower alkyl radicals.

9. An aminoalkyl disubstituted carbamate of the formula

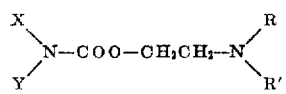

wherein X is a cyclohexyl radical, Y is an alkyl radical and R and R' are lower alkyl radicals.

10. An aminoalkyl disubstituted carbamate of the formula

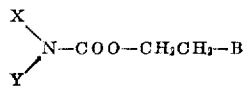

wherein X and Y are cyclohexyl radicals and B is a saturated heterocyclic radical linked to the alkylene group through a nitrogen atom.

11. β-Diethylaminoethyl dicyclohexylcarbamate.
12. β-Diethylaminoethyl n-hexylcyclohexylcarbamate.
13. β-Pyrrolidinoethyl dicyclohexylcarbamate.

References Cited in the file of this patent

UNITED STATES PATENTS

| | | |
|---|---|---|
| 2,432,049 | Swan | Dec. 2, 1947 |
| 2,480,224 | Cusic | Aug. 30, 1949 |
| 2,585,826 | Olsen | Feb. 12, 1952 |
| 2,605,267 | Reid | July 29, 1952 |
| 2,615,024 | Clinton et al. | Oct. 21, 1952 |
| 2,623,046 | Cusic | Dec. 23, 1952 |
| 2,651,658 | Bohl | Sept. 8, 1953 |
| 2,657,210 | Clinton | Oct. 27, 1953 |

FOREIGN PATENTS

| | | |
|---|---|---|
| 67,192 | Norway | Dec. 20, 1943 |

OTHER REFERENCES

Chem. Abstracts, vol. 44, col. 10025 (1950), citing J. Pharm. Exptl. Therap., 99:343–349 (1950).

Winbury et al.: Jr. Pharmacol. Expertl. Therap., 99:343–349 (1950).

UNITED STATES PATENT OFFICE
CERTIFICATE OF CORRECTION

Patent No. 2,794,810                                           June 4, 1957

John W. Cusic

It is hereby certified that error appears in the printed specification of the above numbered patent requiring correction and that the said Letters Patent should read as corrected below.

Column 4, line 11, for "22 mm." read --2 mm.--; column 5, lines 17 and 44, for "dicyclohexylcarbaamte" read --dicyclohexylcarbamate--; column 6, line 32, for "887 parts" read --87 parts--; line 75, for "120-134°" read --129-134° C.--; column 7, line 1, for "60 parts" read --62 parts--; line 10, for "155-150° C." read --155-159° C.--; line 34, for "Pyrolidino-ethyl" read --Pyrrolidinoethyl--.

Signed and sealed this 24th day of September 1957.

(SEAL)
Attest:

KARL H. AXLINE
Attesting Officer

ROBERT C. WATSON
Commissioner of Patents